United States Patent [19]

More

[11] 4,361,449

[45] Nov. 30, 1982

[54] PROCESS FOR THE PREPARATION OF PRE-MELTED, BASIC WELDING POWDERS FOR SUBMERGED ARC WELDING

[75] Inventor: Anton More, Burghausen, Fed. Rep. of Germany

[73] Assignees: Wacker-Chemie GmbH, Munich; Messer Griesheim GmbH, Frankfurt am Main, both of Fed. Rep. of Germany

[21] Appl. No.: 299,956

[22] Filed: Sep. 8, 1981

[30] Foreign Application Priority Data

Sep. 26, 1980 [DE] Fed. Rep. of Germany ....... 3036438

[51] Int. Cl.$^3$ .............................................. B23K 35/24
[52] U.S. Cl. ....................................................... 148/26
[58] Field of Search .......................................... 148/26

[56] References Cited

U.S. PATENT DOCUMENTS

| | | | |
|---|---|---|---|
| 3,892,561 | 7/1975 | Takashima | 148/26 |
| 3,959,031 | 5/1976 | More | 148/26 |
| 4,066,478 | 1/1978 | DeHaeck | 148/26 |
| 4,205,218 | 5/1980 | Fukami | 148/26 |
| 4,207,121 | 6/1980 | Nakabayashi | 148/26 |

*Primary Examiner*—P. D. Rosenberg
*Attorney, Agent, or Firm*—Allison C. Collard; Thomas M. Galgano

[57] ABSTRACT

A process for the preparation of pre-melted, basic welding powder for the submerged arc welding process which consists of preparing two components, one component containing substantially oxidic compounds and maximally 5% by weight of fluoridic compounds, and the other component containing substantially fluoridic compounds and maximally 5% by weight of oxidic compounds, with the total of oxidic and fluoridic compounds corresponding to the desired analytical composition of the powder. Each of the two compounds are melted separately and, the premelted components are cooled. The cooled product is then ground to the desired grain size and thereafter mixed. The welding powders according to the invention are distinguished by a particularly low moisture content.

3 Claims, No Drawings

PROCESS FOR THE PREPARATION OF PRE-MELTED, BASIC WELDING POWDERS FOR SUBMERGED ARC WELDING

The invention relates to a process for the preparation of premelted, basic welding powders for the so-called "submerged arc" method or process (hereinafter referred to as the "SA" process), the powders having the following analytical content:

0.5–20% by weight of $SiO_2$;
15–35% by weight of $Al_2O_3$;
0.05–10% by weight of $TiO_2$;
up to 10% by weight of $ZrO_2$;
0.01–10% by weight of MnO;
0.1–3% by weight of iron oxide;
20–40% by weight of alkaline earth compounds;
15–35% by weight of fluorides, especially fluorspar;
0.3–3% by weight of alkaline oxides; and
impurities contained in the raw materials.

Welding powders of the above type are commercially available and have heretofore been used in "SA" welding.

In order to obtain welds of high quality, and particularly high tenacity in the "SA" process, it is necessary to use basic welding powders; these, however, are hygroscopic.

The inherent problems are well known. In the "SA" process, an electric arc burns which is covered by poured-on welding powder while a wire electrode is melting down. The metal drops splattered in the arc react with the water content of the welding powder to form hydrogen. The hydrogen formed dissolves in the steel with the consequence that due to the high temperature-dependence of the hydrogen in the steel, cracks frequently form in the steel upon cooling in the welding piece or near the seam. Such a phenomenon occurs, especially in the working of fine-grain construction steels.

Therefore, high requirements are made regarding the low moisture content of "SA" welding powders.

Normally, the preparation of basic welding powders is brought about by melting the raw materials in the composition desired for the purpose, pouring the melt in iron troughs, and subsequently grinding the product to the desired grain size.

Such welding powders attract water on the surface after a comparatively short time. They are therefore pre-dried to 250° C. before use. With these powders, a hydrogen content of about 8 ppm per 100 g melted-down wire is obtained, measured according to the tentative standard DIN 8572.

However, a hydrogen content of below 5 ppm is desirable. This difference, while appearing insignificant, may be decisive when fine grain construction steels are welded, whether or not cracks in the welded goods appear. These low values can be obtained with welding powders which, after grinding to the desired grain size, are heated once more to incandescence at about 1000° C. However, such a heating procedure is cumbersome and expensive.

It is therefore the object of the invention to develop a process for making basic molten welding powders for the "SA" process which correspond to the after-annealed welding powders heated to 1000° C., relative to the low moisture content thereof, while eliminating the circuitous process of the subsequent annealing step.

It has now been found unexpectedly that basic, premelted welding powders which fulfill the above-mentioned requirements, can be obtained when the oxidic and fluoridic components corresponding to the desired composition, are melted separately.

The invention therefore consists of a process for preparing basic welding powders for the "SA" welding, wherein the welding powders are made by mixing substantially oxidic components, which contain at most 5% by weight of a fluoridic component, with substantially fluoridic components having a maximum content of 5% by weight of oxidic components, the decisive feature being that the mainly oxidic components on the one hand, and the mainly fluoridic components, on the other hand, are separately melted before being mixed.

Technically useful for the "SA" welding process are basic welding powders of the following composition:

0.5–20% by weight of $SiO_2$;
15–35% by weight of $Al_2O_3$;
0.05–10% by weight of $TiO_2$;
up to 10% by weight of $ZrO_2$;
0.01–10% by weight of MnO;
0.1–3% by weight of iron oxide;
20–40% by weight of alkaline earth compounds;
15–35% by weight of fluorides, especially fluorspar;
0.3–3% by weight of alkaline oxides; and
impurities contained in the raw materials.

For preparing the welding powders according to the invention, the same powders are used as starting material, as were used up to now for the "SA" welding process.

The substantially oxidic components may contain a maximum content of 5% by weight of fluoridic components. They are, e.g., melted down in furnaces lined with carbon, the lower temperature limit being, of course, the melting point of the mixture. In general, the temperatures lie between 1500° and 1800° C. The molten product is poured into iron troughs and, after cooling, is ground to the desired grain size, usually <2 mm.

The treatment of the predominantly fluoridic components which may contain a maximum content of 5% by weight of oxidic components, is carried out in a similar manner. The molten basic welding powders are then obtained by simple mixing of the premelted and granulated components. The weight ratio of the components is determined in accordance with the desired total composition of the welding powder.

The hydrogen content of the welding powders according to the invention may be at least as low as that of the welding powders after heated to 1000° C. The process according to the invention thus makes it possible to omit the cumbersome and expensive procedure of exposing the powders to a second annealing step.

In the following, the invention will be described by a number of examples, but it should be understood that these are given only by way of illustration and not of limitation.

EXAMPLE 1

An oxidic component having the following composition:

$SiO_2$: 18.90% by weight;
$Al_2O_3$: 19.33% by weight;

FeO: 0.50% by weight;
TiO$_2$: 5.89% by weight;
MnO: 3.19% by weight;
CaO: 7.62% by weight;
MgO: 33.78% by weight;
CaF$_2$: 2.86% by weight;
ZrO$_2$: 5.61% by weight;
Na$_2$O: 0.72% by weight;
K$_2$O: 0.67% by weight; and
impurities contained in the raw materials;

is melted in a carbon-lined furnace at 1700° C. After a melting time of 2–4 hours, and after complete melting has taken place, the molten mixture is poured into an iron trough and, after cooling, ground to a grain size of 0.3 to 1.75 mm.

A fluoridic component having the following composition:

SiO$_2$: 0.73% by weight;
CaF$_2$: 97.89% by weight;
K$_2$O: 0.95% by weight; and
impurities of the raw materials, is melted at a temperature of 1600° C. in a carbon-lined furnace. After a melting time of 2–4 hours, and after complete melting has taken place, the molten mixture is poured off and, after cooling, ground to a grain size of 0.3 to 1.75 mm.

The desired welding powder is obtained by mixing 83% by weight of the oxidic component with 17% by weight of the fluoridic component. Therefore, the total composition of the welding powder is:

15.81% by weight of SiO$_2$;
16.04% by weight of Al$_2$O$_3$;
0.41% by weight of FeO;
4.89% by weight of TiO$_2$;
2.65% by weight of MnO;
6.32% by weight of CaO;
28.04% by weight of MgO;
19.02% by weight of CaF$_2$;
4.66% by weight of ZrO$_2$;
0.60% by weight of Na$_2$O;
0.72% by weight of K$_2$O; and
impurities contained in the raw materials.

When welding is carried out with the welding powder according to the invention, one finds after the conventional pre-drying at 250° C., 3.8 ml hydrogen per 100 g melted-down wire, determined by the tentative standard DIN 8572.

COMPARISON EXAMPLE 1

For the purpose of comparison, a welding powder of commercial brand is used having almost the same composition, but which is melted as a homogeneous powder, i.e., it is not separated into oxidic and fluoridic components.

Analytical composition of the powder:

17.12% by weight of SiO$_2$;
16.27% by weight of Al$_2$O$_3$;
0.38% by weight of FeO;
5.13% by weight of TiO$_2$;
2.97% by weight of MnO;
6.25% by weight of CaO;
27.37% by weight of MgO;
18.17% by weight of CaF$_2$;
5.00% by weight of ZrO$_2$;
0.35% by weight of Na$_2$O; and
0.76% by weight of K$_2$O
impurities contained in the raw materials.

The determination of the hydrogen content is carried out as described in Example 1. Found were 7.8 ml hydrogen per 100 g melted-down wire.

COMPARISON EXAMPLE 2

The procedure is the same as in Comparison Example 1 with the difference that the welding powder is additionally heated to 1000° C. The hydrogen content amounts to 4.3 ml per 100 g melted-down wire.

Thus, while only several examples have been described, it will be obvious that many changes and modifications may be made in the invention, without departing from the spirit and scope thereof.

What is claimed is:

1. A process for the preparation of premelted, basic welding powders for submerged arc welding, having an analytical content of:
    0.5–20% by weight of SiO$_2$;
    15–35% by weight of Al$_2$O$_3$;
    0.05–10% by weight of TiO$_2$;
    up to 10% by weight of ZrO$_2$;
    0.01–10% by weight of MnO;
    0.1–3% by weight of iron oxide;
    20–40% by weight of alkaline earth compounds;
    15–35% by weight of fluorides;
    0.3–3% by weight of alkaline oxides; and
    impurities contained in the raw materials, comprising the steps of:
    preparing a component containing substantially oxidic compounds, with up to 5% by weight of fluoridic compounds, and a component containing substantially fluoridic compounds, with up to 5% by weight of oxidic compounds;
    melting said two components separately to produce separate melts;
    cooling said melts to produce two separate solidified products;
    separately grinding said two products; and
    mixing said two ground products to obtain a welding powder having the aforesaid analytical content.

2. The process according to claim 1, wherein said products is ground to a grain size of <2 mm.

3. The process according to claim 1, wherein said fluorides comprise fluorspar.

* * * * *